US009434068B2

(12) United States Patent
Frisk

(10) Patent No.: US 9,434,068 B2
(45) Date of Patent: Sep. 6, 2016

(54) SYSTEM FOR DOCKING A MOVABLE PLATFORM

(71) Applicant: Opiflex Automation AB, Västerås (SE)

(72) Inventor: Johan Frisk, Täby (SE)

(73) Assignee: Opiflex Automation AB, Vasteras (SE)

(*) Notice: Subject to any disclaimer, the term of this patent is extended or adjusted under 35 U.S.C. 154(b) by 0 days.

(21) Appl. No.: 14/698,314

(22) Filed: Apr. 28, 2015

(65) Prior Publication Data

US 2015/0314437 A1   Nov. 5, 2015

(30) Foreign Application Priority Data

May 5, 2014   (SE) ..................... 1450527

(51) Int. Cl.
*B23Q 1/00* (2006.01)
*B25J 5/00* (2006.01)
(Continued)

(52) U.S. Cl.
CPC ................ *B25J 9/10* (2013.01); *B23Q 1/0063* (2013.01); *B25J 5/00* (2013.01); *F16B 5/0056* (2013.01);
(Continued)

(58) Field of Classification Search
CPC .......... B23Q 1/0063; B25J 5/00; B25J 9/10; F16B 5/0056; F16B 5/0084; F16B 5/0088; F16B 5/0621; F16B 5/065; F16B 9/00; F16B 9/02; F16B 17/00; Y10T 403/33; Y10T 403/39; Y10T 403/3913; Y10T 403/46; Y10T 403/4694; Y10T 403/7015; Y10T 403/7039; Y10T 403/7045; Y10T 403/7094; Y10T 29/49826; Y10T 29/49895; Y10T 29/49899; Y10T 24/45225; Y10T 24/45262; Y10T 24/45471

USPC ....... 403/167, 187, 189, 230, 263, 353, 364, 403/381, 361; 29/428, 464, 466; 24/591.1, 24/595.1, 604
See application file for complete search history.

(56) References Cited

U.S. PATENT DOCUMENTS 4,433,931 A * 2/1984 Malish ..................... B25G 3/30
403/263
5,555,763 A   9/1996 Takeshita
(Continued)

FOREIGN PATENT DOCUMENTS

EP   1321221 A1   12/2002
FR   2718666 A1   10/1995
(Continued)

OTHER PUBLICATIONS

Office Action issued in Dec. 10, 2014 in Swedish Application No. 1450527-5.
(Continued)

*Primary Examiner* — Josh Skroupa
(74) *Attorney, Agent, or Firm* — Kim Winston LLP

(57) ABSTRACT

A system for docking a platform adapted to carry a manipulator, in relation to a workstation. The system comprises a plurality of protruding members attached to the platform, a docking station arranged at the workstation and comprising a plurality of recesses adapted to receive the protruding members for positioning the platform relative the workstation. Each of the recesses comprises a positioning section defining a space and a supporting section tapering towards the positioning section and having at least one support surface, and the protruding members are protruding away from a bottom surface of the platform, and an outer end of each of the protruding members comprises a positioning portion designed to at least partly fit in said space, and a bearing portion tapering towards the positioning portion and having a bearing surface adapted to bear on the support surface when the positioning portion is fitted in said space.

9 Claims, 3 Drawing Sheets

(51) Int. Cl.
*B25J 9/10* (2006.01)
*F16B 5/06* (2006.01)
*F16B 5/00* (2006.01)

(52) U.S. Cl.
CPC ............ *F16B 5/0088* (2013.01); *F16B 5/065* (2013.01); *Y10T 24/45262* (2015.01); *Y10T 29/49899* (2015.01); *Y10T 403/33* (2015.01); *Y10T 403/4694* (2015.01); *Y10T 403/7039* (2015.01)

(56) References Cited

U.S. PATENT DOCUMENTS

| | | | | |
|---|---|---|---|---|
| 6,513,802 B2* | 2/2003 | Seger | ............... | B25B 11/005 269/20 |
| 6,799,758 B2 | 10/2004 | Fries | | |
| 8,695,201 B2* | 4/2014 | Morris | ............... | B25B 27/00 24/453 |
| 8,833,830 B2* | 9/2014 | Renke | ............... | B60R 13/0206 24/295 |
| 2009/0096182 A1 | 4/2009 | Hedlund et al. | | |
| 2011/0130875 A1 | 6/2011 | Abramson | | |

FOREIGN PATENT DOCUMENTS

| | | |
|---|---|---|
| JP | 2009107029 | 5/2009 |
| KR | 100782863 | 12/2007 |
| WO | 2010043640 A2 | 4/2010 |

OTHER PUBLICATIONS

European Patent Office, Extended Search Report, dated Oct. 6, 2015 in EP Application No. 15162062.2-1702.

* cited by examiner

SYSTEM FOR DOCKING A MOVABLE PLATFORM

CROSS-REFERENCE TO RELATED APPLICATIONS

This application claims foreign priority to Swedish Patent Application No. 1450527-5 filed May 5, 2014, entitled "A System For Docking A Movable Platform," the entire disclosure of which is hereby incorporated by reference in its entirety.

FIELD OF THE INVENTION

The present invention relates to a system for docking a movable platform adapted to carry a manipulator, in relation to a workstation. The invention also relates to the use of the docking system.

BACKGROUND OF THE INVENTION AND PRIOR ART

In many small factories the manufacturing takes place at different workstations containing one or several fixed machines. Manipulators, such as a robot, tending the machines or performing work tasks can be used in order to increase productivity, cost efficiency, quality or remove monotonous and hazardous work tasks. It is usually not economically feasible to install a robotic device at each working machine if the working machine has low utilization or the batch sizes are small. For small batch sizes, manual operation of the machines is wanted. Therefore, there is a need to easily move a robot unit between different workstations to obtain an optimal use of the robot and get easy manual access to the machines.

To improve the degree of use of the robot, the robot is placed on a movable platform, which is able to move between the workstations and connect to at least one docking station positioned at each workstation. The movable platform can be moved manually by hand or with a so called Automatic Guided Vehicle (AGV). The AGV may also be part of the platform. Through the connection to the docking station, the movable platform is fixed in a defined position in relation to the workstation. It is important for the robot to have a defined position in relation to the workstation to be able to perform complex and/or precise operations, such as welding, gluing, painting, grinding, picking, assembly, etc., at the workstation.

U.S. 2009/00906182 discloses a robot, which moves along a plurality of predefined paths between a plurality of workstations. Along the path the robot stops at each work-station and performs work at each work-station.

WO2010/043640 discloses an industrial robot system for working on a plurality of workstations. Each workstation is provided with a docking station comprising of protruding members extending into the work space. The robot is moved between the workstations by a movable platform. A connection device and a locking device are provided to connect and lock the platform to the docking station. A problem with the docking station disclosed in WO2010/043640 is that it is protruding and accordingly becomes an obstacle in the robot work area.

SUMMARY OF THE INVENTION

It is an object of the present invention to provide an improved docking system. This object is achieved by a system as defined in claim 1.

The system for docking a movable platform is adapted to carry a manipulator, such as a robot. The system comprises a plurality of protruding members attached to the platform and a docking station to be arranged at the workstation. The docking station comprises a plurality of recesses that are adapted to receive the protruding members. In that way, the platform can be positioned relative to the workstation. The system is characterized in that each of the recesses comprises a positioning section, which defines a space and a supporting section tapering towards the positioning section and having at least one support surface. The support surface slopes towards the positioning section. The protruding members are protruding away from a bottom surface of the platform. An outer end of each of the protruding members comprises a positioning portion designed to at least partly fit in said space, and a bearing portion having a bearing surface. The bearing surface is tapered towards the positioning portion, and the bearing surface is adapted to bear on the support surface, when the positioning portion is fitted in said space. The positioning section and the positioning portion are designed so that an accommodation is formed below the positioning portion when the positioning portion is fitted in said space.

The term recess will cover an indentation, a cavity as well as a through hole.

The docking system according to the invention carries out docking downwards in a direction from the platform and towards the floor. The docking station can be made very thin, for example in the form of a thin plate and positioned on the floor, or recessed in the floor. Preferably, the docking station is plate shaped, i.e. in the form of a docking plate. The docking station is designed so that it can be mounted in level with the floor and without any protruding parts. Thus, the docking station will not be an obstacle in the robot work area, and not in the way for manual operation or when maintaining the machine or work station.

The docking station is attached to the floor and the movable platform is positioned above the docking station when the platform is docked to the docking station. Thereby, a protruding docking station is avoided.

The protruding members are protruding away from a bottom surface of the platform in the direction of the floor, and thus do not protrude from a side of the platform into a work space at the workstation. The protruding members do not occupy space and are not a hindrance for workers or servicing the machines. With the new system more space is available at the workstation. Further, the safety of the workers at the workstations is improved.

The positioning portion and the positioning section provide for a precise and defined positioning of the platform in a horizontal plane defined by a ground surface or floor and crossing the central axis. The bearing portion and the supporting section provide for a precise positioning in a vertical direction.

However, a problem when docking downwards is that after a while, dirt and dust will end up in the recesses in the docking station, and this will reduce the accuracy of the positioning of the platform. Dust particles may affect the position of the platform in an axial or vertical direction. According to the invention, an accommodation for collecting dust and dirt is formed below the positioning portion when the positioning portion is fitted in said space. The supporting section tapers towards the positioning section. Thus, the surface of the support section slopes towards the positioning section. The slope of the support section of the recess enables dust particles to glide on the surface of the supporting section and into the positioning section. Thus, dust and dirt will not remain on the support surface and will end up in the accommodation formed below the positioning portion. Accordingly, dust and dirt will not affect the precision of the platform.

The accommodation is a part of the space defined by the positioning section. The accommodation below the outer end of the protruding member provides the space needed for holding dust and dirt (herein after called dust) that may accumulate in the recesses. Due to the accommodation, the dust does not affect the positioning or stability of the platform when it is docked in the docking station.

The tapered shape of the support surface also provides for efficient steering and stabilization of the protruding member into the space.

The invention provides a simple and robust docking system, whereby the platform can be steered into an exact position. The docking system comprises few parts that can easily be installed in existing platforms and workstations.

According to an embodiment of the invention, the support surface has an angle $\alpha_1$ in relation to a center axis of the recess, and the angle $\alpha_1$ of the support surface is between 30 and 70°, preferably between 35 and 65°, and most preferably between 40 and 55°. The angle $\alpha_1$ is adapted to assist the positioning of the protruding member in the recess to provide for efficient steering and stabilization of the protruding member into the space. The angle $\alpha_1$ is selected so that the support section provides a sufficient support for the bearing portion and to enable dust to glide from the supporting surface into the recess. The slope of the support section is such that dust and dirt will not remain on the support surface and will end up on a bottom surface of the space. Thereby, dust cannot affect the positioning or stability of the platform in the vertical direction.

According to another embodiment of the invention, the positioning section and the positioning portion are designed so that the accommodation is formed between a bottom of the positioning section and the positioning portion when the positioning portion is fitted in said space. Alternatively, the recess in the positioning section does not have any bottom. In that case, the accommodation is formed between the floor and the positioning portion.

According to an embodiment of the invention, the height of the positioning portion is less than the height of the positioning section in order to form the accommodation for collecting dust below the positioning portion.

According to a further embodiment of the invention, said accommodation has a height of at least 0.1 mm, preferably at least 0.5 mm, and most preferably at least 1 mm. In one embodiment the height is at least 3 mm. The height is adapted to prevent dust accumulated in the space to affect the position of the positioning portion in a vertical direction, and by that provide for a precise positioning in a vertical direction.

According to an embodiment of the invention, each of the recesses comprises a funnel shaped guiding section tapering towards the supporting section, and the guiding section has a guiding surface defining an angle in relation to the center axis of the recess, and the angle defined by the guiding surface is equal to or larger than the angle defined by the support surface. It may be difficult to position the platform in the right position in relation to the docking station. The guiding surface assists in positioning the platform in the horizontal plane. When the protruding members are positioned slightly at the side of the recess, the guiding surface will guide the protruding member towards the support surface and into the recess. This improves the positioning procedure of the platform in relation to the workstation. The efficiency of docking the system and the manipulator is thereby improved.

Preferably, the angle defined by the guiding surface is larger than the angle defined by the support surface. The slope of the support surface is preferably steeper than the slope of the guiding surface to make sure that no dust particles will remain on the support surface and negatively affect the precision of the positioning of the platform. If dust particles remain on the guiding surface it does affect the precision of the positioning of the platform. The slope of the guiding area should be such that the positioning portion member is allowed to glide over the guiding surface by help from gravity. However, the size of the guiding area in a horizontal plane affects the tolerances of the positioning of the platform relative to the docking section during the docking. A larger size of the guiding area in a horizontal plane increases the tolerances of the positioning of the platform relative to the docking section.

The positioning portion should slide on the guiding surface in a direction towards the supporting section. When the positioning portion reaches the support surface, the positioning portion will slide on the support surface towards the positioning section until the positioning portion is fitted in the space defined by the positioning section. Thus, the guiding section and the supporting section will facilitate the placing or positioning of the protruding member in the recess.

According to another embodiment of the invention, the angle $\alpha_2$ of the guiding surface is defined by an equation tan $(90°-\alpha_2)$ $\mu$, whereby $\mu$ is the static friction coefficient between the guiding surface and the positioning portion. The angle $\alpha_2$ is selected so that the outer end of the protruding member is allowed to glide over the guiding surface by help from gravity. The angle $\alpha_2$ depends on the friction between the guiding surface and the positioning portion. If there is a low friction between the guiding surface and the positioning portion, the angle $\alpha_2$ of the guiding surface can be larger than when there is a high friction between the guiding surface and the positioning portion.

According to a further embodiment of the invention, the recess is rotationally symmetric and a radial distance between an upper periphery of the guiding surface and a lower periphery of the support surface is more than 5 mm. To improve the docking procedure the protruding member needs to be fitted into the recesses in a fast and efficient manner. If the distance is too small, more time is needed to position the protruding member above the recess before guiding the protruding member towards the space.

According to an embodiment of the invention, the recess, the bearing portion, and the positioning portion are rotationally symmetric. If the recess is symmetric in relation to the center axis, this will further facilitate the placing or positioning of the protruding member in the recess.

According to another embodiment of the invention, at least a part of the positioning portion is cylindrically shaped. Preferably, it is cylindrically circular. This provides for a simple and robust structure that can be manufactured at relatively low cost compared to other shapes for these portions.

According to a further embodiment of the invention, the protruding members are designed as legs arranged to support the platform. In one embodiment the platform comprises three or four protruding members, or legs. At least two protruding members are needed for steering or positioning the platform in a precise or correct position in the horizontal plane. At least three protruding members are needed to steer or position the platform in a correct or accurate axial direction. For the overall stability and balance of the platform it may be convenient to have four protruding members on the platform.

According to an embodiment of the invention, each of the protruding members comprises a distance portion arranged between the platform and said outer end. A length of the protruding members may be varied by changing the length of the distance portion. The distance portion create a space between the platform and the bottom surface of the docking station. This space provides room for a fork of a manual pallet truck or AGV-truck to lift the platform and transport the platform to a new position, such as another workstation. The said distance can also be used to mount wheels under the platform that can be lifted or lowered in order to get the protruding members into the recesses. If the platform has wheels, a standalone AGV can be attached to the platform, and drag the platform to a wanted position.

According to an embodiment of the invention, the system further comprises a locking device configured to lock the platform to the docking station when the protruding member is inserted in the space, whereby the locking device is selected from the group of an electromagnetic lock, a vacuum lock, a mating lock comprising a locking member and a receiving member.

To further improve the stability of the docking system a locking device can be used to lock the docked platform to the docking station. By such a stable connection the position of the platform at the docking station will be less affected by the movements of the manipulator positioned on the platform.

According to another embodiment of the invention, the system further comprises a locking device configured to lock the platform to the docking station when the protruding member is inserted in the space, whereby the locking device comprises a locking member and a receiving member, wherein the locking member is arranged on one end of the platform and docking station and the receiving member is arranged on the other end of the platform and docking station.

According to a further embodiment of the invention, the locking member is selected from the group comprising a locking bar, a locking pin, a locking ball, a locking expander, a locking nail and a locking screw, and the receiving member is arranged to receive the locking member and is selected from the group comprising a groove, a hole, a threaded hole, an indent. Different types of locking devices for providing stable locking can be used and easily installed on the platform and the docking station.

The invention also relates to use of the system according to the invention for positioning a mobile manipulator in relation to a workstation. The recesses have openings, the docking station is attached to a floor with the openings turned upwards, the manipulator is positioned on the movable platform, the protruding members are directed downwards towards the floor, and a docking operation is carried out by inserting the protruding parts into the recesses until the positioning portions are positioned in the positioning sections.

BRIEF DESCRIPTION OF THE DRAWINGS

The invention will now be explained more closely by the description of different embodiments of the invention and with reference to the appended figures.

DETAILED DESCRIPTION OF VARIOUS EMBODIMENTS OF THE INVENTION

Figure 1:
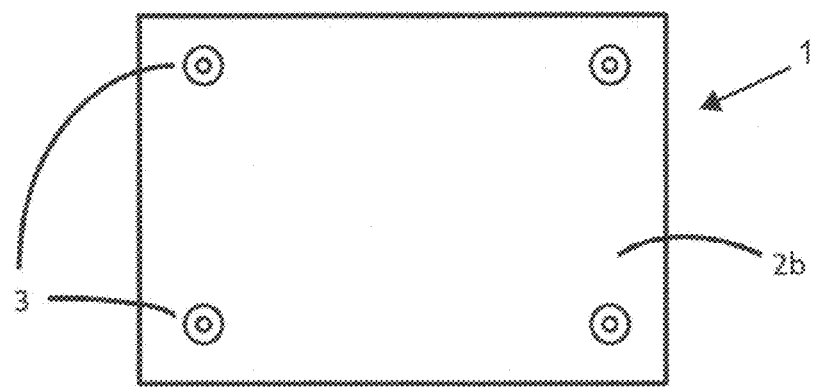
FIG. 1 shows an example of a platform with four protruding members in a view from below.
Figure 2:
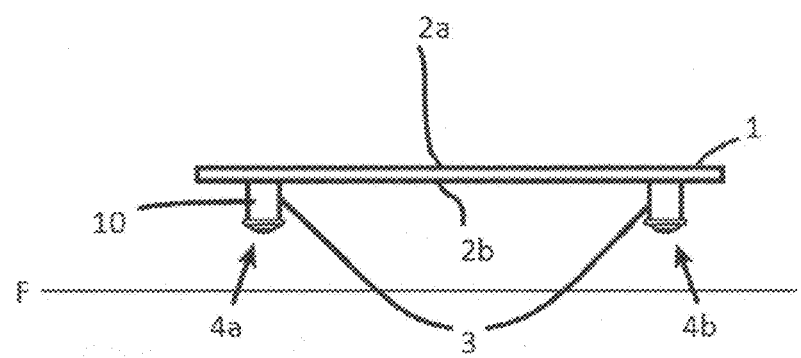
FIG. 2 shows a side view of the platform shown in FIG. 1.

FIGS. 1 and 2 shows an example of a movable platform 1. FIG. 1 shows a view from below of the platform and FIG. 2 shows a side view of the platform. The movable platform 1 has a top surface 2a and a bottom surface 2b. The surfaces extend along a horizontal plane parallel to a floor F. A plurality of protruding members 3 protrude from the bottom surface of the platform and may be designed as legs supporting the platform. The platform may have two, three or more legs. In this embodiment, the platform is provided with four legs to support the platform. The protruding members 3 may be fixedly attached to the platform. The protruding members 3 may also be linearly movable relative to the platform. The platform may also be provided with wheels. The wheels can be fixed in order to support the platform, or movable relative to the platform.

Figure 3:
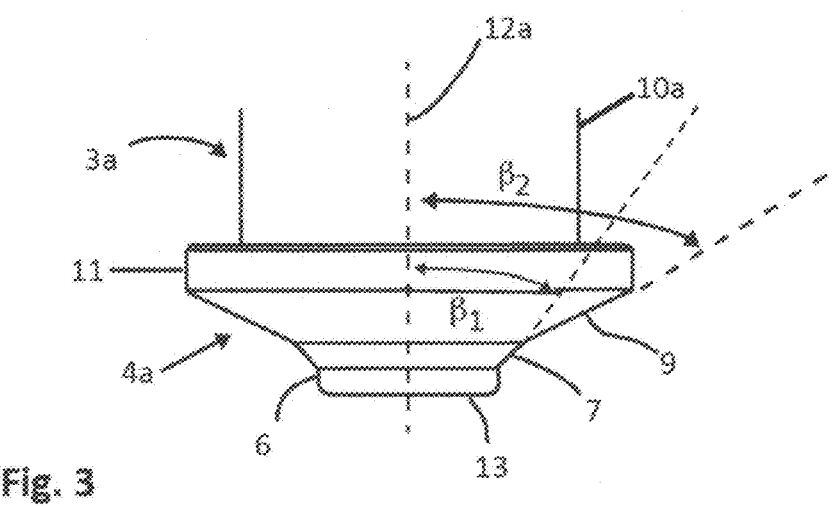
FIG. 3 shows a cross section of a first example of an outer end of a protruding member.
Figure 4:
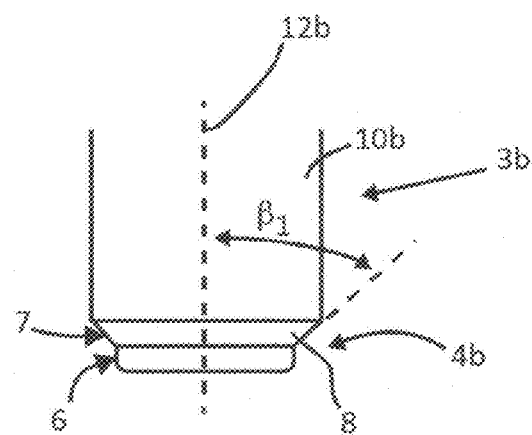
FIG. 4 shows a cross section of a second example of an outer end of a protruding member.
Figure 8:
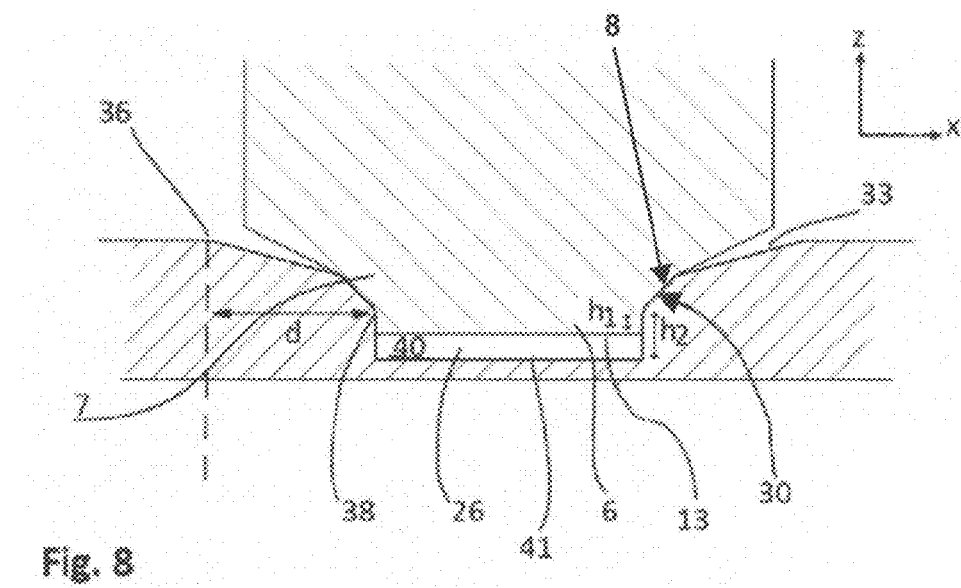
FIG. 8 shows a cross section of a protruding member positioned in a recess.

FIGS. 3 and 4 show two examples of protruding members 3a and 3b. The protruding members 3a-b extend along a central axis 12a, 12b. An outer end 4a, 4b of the protruding member comprises a positioning portion 6 and a bearing portion 7 having a bearing surface 8. The outer end 4a, 4b of the protruding member 3a-b is preferably rotationally symmetric in relation to the central axis. In this example, the positioning portion 6 is cylindrical, and the bearing portion 7 is conically shaped. The outer edge of the positioning portion can be rounded or taken off to facilitate for the positioning portion to glide on a guiding surface. Preferably, the positioning portion 6 is circular cylindrical. However, the shape of a positioning portion 6 and a bearing portion 7 may be, triangular, rectangular, square or other shapes. The positioning portion has a height h1, as shown in FIG. 8. A distance portion 10, 10a, 10b is arranged between the platform 1 and the outer end 4a-b. The outer end 4a, 4b and the distance portion 10, 10a-b, can be arranged as two separate portions attached to each other. As shown in FIG. 3, the outer end 4a may comprise a third portion 9 and an abutting portion 11.

The positioning portion 6 is located at the end of the outer end 4a, 4b. A bottom surface 13 may be flat, conical or concave. From the bottom surface, the surface of the positioning portion 6 extends upwards along the central axis in a direction towards the platform. The surface may extend parallel or about parallel to the axis or at an angle (not shown) in relation to the axis 12a, 12b.

The bearing portion 7 extends from the positioning portion 6. The bearing surface 8 is tapered towards the positioning portion 6 as shown in FIGS. 3 and 4. Hereby, the bearing surface extends at an angle β1 in relation to the central axis 12a, 12b. The third portion 9 extends from the bearing portion 7. The surface of the third portion 9 may be tapered towards the bearing portion as shown in FIG. 3. Hereby, the surface of the third portion extends at an angle β2 in relation to the central axis 12a, 12b. The optional abutting portion 11 may extend from the third portion. The surface of the abutting portion may extend parallel or about parallel to the central axis.

Figure 5:
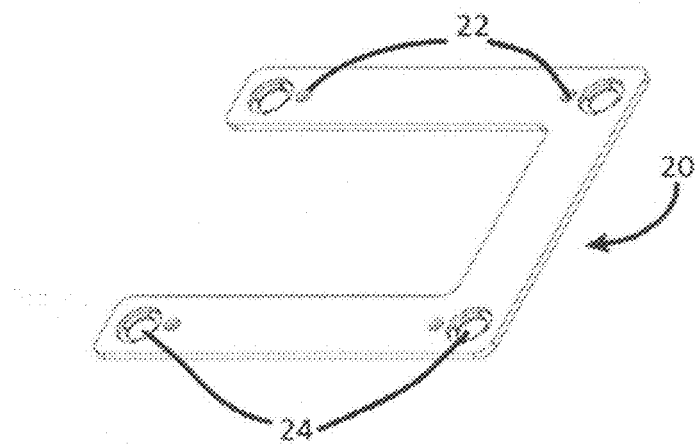
FIG. 5 shows a top view of an example of a docking station.

FIG. 5 shows an example of a docking station 20 seen from above. The docking station 20 is plate shaped in order to be as thin as possible. What plate shaped means is that the height of the docking station is considerably smaller than the length of the docking station. In this embodiment the docking station is U-shaped. However, the docking station may have other shapes, such as square or triangular.

The docking station 20 has a plurality of recesses 24 to position the platform in a correct and defined position. The recesses have openings adapted to receive the protruding members 3. The docking station is designed to be positioned so that the openings of the recesses are positioned upwards. The docking station is adapted to be attached to the floor and may be placed on a ground level or floor, or the docking station may be placed or brought down in the floor. If the docking station is placed in the floor, there are no elements of the docking station protruding from the floor. This improves the safety of the workers at the workstation.

The protruding members and the recesses are arranged to cooperate during a docking operation. The docking station 20 may have two, three or four recesses 24. The number of recesses correspond with the number of protruding members of the platform. The docking station has attachment means 22 to attach the station to the floor.

Figure 6:
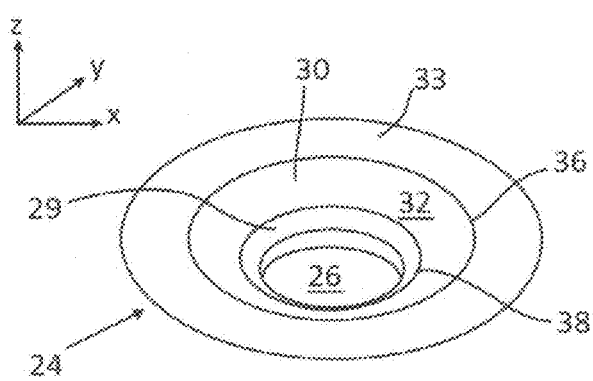
FIG. 6 shows a perspective view of an example of a recess.
Figure 7:
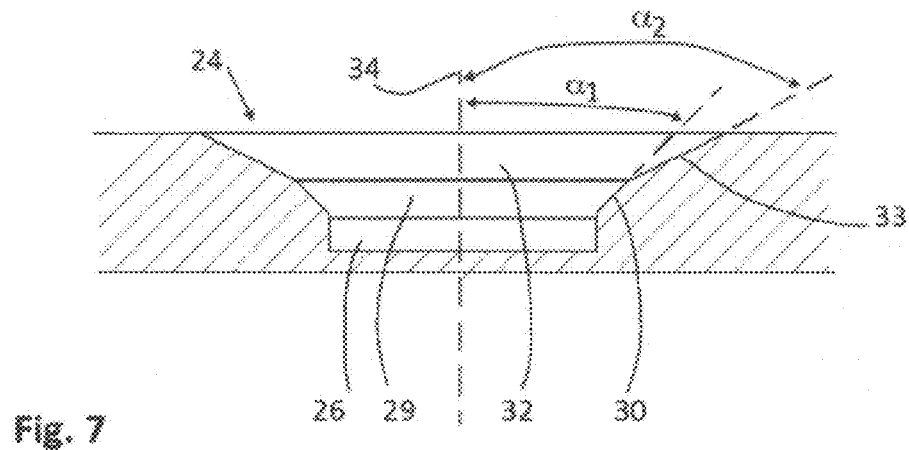
FIG. 7 shows a cross section of the recess shown in FIG. 6.

FIG. 6 shows a perspective view of an example of a recess. FIG. 7 shows a cross section of the recess shown in FIG. 6. As shown in FIGS. 6 and 7, the recess comprises a positioning section 26 defining a space for receiving the positioning portion 6 of the protruding member, and a supporting section 29 tapering towards the positioning section and having a support surface 30. In this example, the positioning section 26 is cylindrical, and the support section 29 is funnel shaped. Each of the recesses 24 may further comprise a funnel shaped guiding section 32 tapering towards the supporting section 29, whereby the guiding section has a guiding surface 33.

The recess extends along a central axis 34, which axis crosses the horizontal plane. The recess is preferably rotationally symmetric in relation to the central axis. However, the shape of the recess may be circular, triangular, rectangular or square. The shapes of the positioning section 26 and the supporting section 29 are adapted to fit the shape of the positioning portion 6 and the bearing portion 7. The shape of the positioning portion 6 should at least partly correspond to the shape of the positioning section 26. Thus, if the shape of the positioning portion 6 is cylindrical, the shape of the positioning section 26 is preferably also cylindrical. The diameter of the positioning portion 6 and the positioning section 26 should then be about the same. However, the height of the positioning section 26 is preferably larger than the height of the positioning portion 6 to allow accumulation of dirt and dust.

FIG. 8 shows a cross section of a protruding member positioned in a recess. The positioning section 26 is located at the end of the recess. A bottom surface 41 of the positioning section 26 may be flat, conical, or convex.

From the bottom surface 41, the surface of the positioning section 26 extends upwards along the central axis 34 in a direction towards the floor. The positioning section has a height h2. The surface may extend parallel or about parallel to the central axis 34 of the recess, or at an angle (not shown) in relation to the central axis. In an alternative embodiment, the recess does not have any bottom and accordingly the positioning section 26 does not have any bottom surface, so that dust falling down in the recess will land on the floor.

The supporting section 29 extends upwards from the positioning section 26. The support surface 30 of the supporting section 29 slopes towards the positioning section 26, as shown in FIGS. 6 and 7. Hereby, the support surface 30 slopes at an angle α1 in relation to the central axis 34. Suitably, the angle α1 defined by the support surface 30 is between 30 and 70°, preferably between 35 and 65, and most preferably between 40 and 55° in order to provide a sufficient support for the bearing portion and to let dust glide from the supporting surface into the recess. The slope of the support section is such that dust and dirt will not remain on the support surface and will end up on a bottom surface of the space. Thereby, dust cannot affect the positioning or stability of the platform in the vertical direction. In this embodiment the angle α1 is about 45°. The angle α1 is the same or substantially the same as the angle β1 of the bearing surface 8, so that the bearing surface 8 is adapted to bear on the support surface 30 when the positioning portion 6 is fitted in the space of the positioning section 26, as shown in FIG. 8.

β1=α1

The guiding section 32 extends from the supporting section 29 to an opening of the recess. The guiding surface 33 of the guiding section 32 slopes towards the supporting section 29, as shown in FIG. 7. Hereby, the guiding surface 33 extends at an angle α2 in relation to the central axis 34. The angle α2 defined by the guiding surface 33 may be between 50 and 88°, and preferably between 55 and 75°. The angle α2 defined by the guiding surface is equal to or larger than the angle α1 defined by the support surface.

α2>=α1

The angle β2 of the third portion 9 should be the same or less than the angle α2. Preferably, the angle β2 is less than the angle α2 to form a gap between the guiding surface and the surface of the third portion when the positioning portion 6 is fitted in the space of the recess, to avoid that dust on the guiding surface that affects the positioning of the protruding member in a vertical direction and by that reduce the precision of the positioning. Such a gap would allow dust that may be present on the guiding surface to remain on said surface without affecting the positioning or stability of the platform in the docking station.

β2=<α1

The angle α2 is preferably slightly larger than the angle of friction relating to the static friction coefficient μ of the material from the positioning portion 6 of the protruding member, thereby providing a steering or guiding of the positioning portion into the space of the recess smoothly by help from gravity on the guiding surface 33. The angle α2 is preferably defined by the equation tan (90°-α2) μ, whereby μ is the friction coefficient between the guiding surface and the positioning portion. Examples of suitable materials to be used for said surfaces may be metal, metal alloys, low wear, or low friction materials, such as plastic composite material or Teflon.

α2<90°—arc tan μ

Preferably, a radial distance d between an upper periphery 36 of the guiding surface 33 and a lower periphery 38 of the support surface 30, shown in FIG. 8, is more than 3 mm, and preferably more than 5 mm, and most preferably more than 10 mm in order to provide a sufficient tolerance in the positioning of the platform in relation to the docking station during docking of the platform.

The height h1 of the positioning portion 6 is less than the height h2 of the positioning section 26, as shown in FIG. 8. Thereby, the positioning section 26 and the positioning portion 6 are designed so that an accommodation 40 is formed between a bottom surface 41 of the positioning section and the bottom surface 13 of the positioning portion, when the positioning portion is fitted in the space. In this embodiment the accommodation is cylindrical. However, the accommodation may have other shapes in depending on the shape of the positioning portion and the positioning section. For example, the bottom surface 41 of the positioning section and/or the bottom surface 13 of the positioning portion may be concave or conical and by that an accommodation is formed between the bottom surfaces. The height of the accommodation 40 may be at least 0.1 mm, preferably at least 0.5 mm, or at least 1 mm, or at least 2 mm. The larger the height of the accommodation, the more dust and larger dust particles that can be stored in the accommodation without affecting the accuracy of the positioning.

The positioning portion 6 is designed to fit in the space in the positioning section 26 in a radial direction, and the bearing portion is bearing on the support section, as shown in FIG. 8.

At least two of the protruding members 3 are provided with outer parts 4a-b to be inserted into recesses 24. Once the platform 1 is positioned above the docking station 20 the protruding members are inserted into the recesses in the docking station. If the positioning portion 6 of the protruding member is positioned on the guiding surface 33, the positioning portion 6 slides on the guiding surface towards the support surface, and then slides on the support surface 30 towards the positioning section 26 until the positioning portion 6 reaches the positioning section 26 and is fitted in the space in the positioning section 26.

In an alternative embodiment, the platform may further comprise wheels to allow the platform to be pulled.

The system may further comprise a locking device arranged to provide a locking of the platform on the docking station, when at least one of the protruding member is inserted into at least one of the spaces. The locking mechanism may include a controllable magnet, for example, a controllable permanent magnet, which can be switched on and off, or an electromagnet. In this case, the magnet may be arranged on the movable platform and the protruding member includes a magnetic material, or an electromagnet may be provided in the docking station and a wire is present around the protruding member as a coil. The locking device may also be a vacuum lock, whereby a vacuum device is installed on or under the platform and on the docking station, which together provide a vacuum lock between the platform and the docking station.

Another locking device may be a so called mating lock comprising a locking member and a receiving member. One or more members may be installed for each system. The locking member is arranged on one end of the platform and docking station and the receiving member is arranged on the other end of the platform and docking station. The locking member is preferably arranged on the bottom surface 2b of the platform. This member is movably attached to the platform such that it can be inserted into the opening in the platform during movement of the platform and ejected to be inserted into the receiving member. Examples of locking members may be a locking bar, a locking pin, a locking expander, a locking nail and a locking screw. Examples of receiving members may be a groove, a hole, a threaded hole, and an indent.

The locking member may have two indentations. These indentations are adapted to be engaged in the receiving members. The receiving members may be expanders. Alternatively, an expander may be positioned in the indentation and the receiving members may be indentations adapted to receive the expander such as a ball or pellet.

The system may further comprise a power unit 54 configured to move the platform between workstations. At the workstation, the platform is positioned above the docking station and the protruding members can be engaged by guiding at least one of the protruding members 3 into at least one of the spaces of the recess 24. The locking device can also be engaged by guiding the locking member into the receiving member.

The precise position of the machine on the platform in relation to a workstation can be determined using calibration. Calibration may be used in combination with the docking system and/or a locking device. Calibration can also be used in combination with a locking device, without using the system.

A control unit may be used to control the connections between the platform and the docking station. The control unit may be connected to one or more transmitters present at each of the protruding members and/or locking members. The transmitters are configured to transmit signals between the control unit and the system and/or locking device. For example, the control unit transmits a signal to a transmitter positioned in a protruding member. Upon receiving this signal, the protruding member is inserted into the space of the recess. Once the protruding member is fitted stably in the space (i.e. the positioning portion 6 of the protruding member and the positioning section 26 of the recess are at least partly in contact with each other, a transmitter present in the space transmits a signal to the control unit. Subsequently, the control unit may transmit a signal to the locking device to lock the platform to the docking station. If the locking device is a mating lock, a transmitter may receive a signal from the control unit to engage the locking member with the receiving member. Once the locking has been accomplished, a transmitter may transmit a signal to the control unit to confirm the locking. When the manipulator 42 is ready to be moved to another workstation, the system and locking device need to be disengaged. A controller or a programmed code transmits a signal to the control unit, which then transmits a signal to the transmitters to disengage the system and/or locking devices. The protruding members and/or locking device will be extracted from the space and/or receiving member. Detailed examples of locking devices are described in WO2010/043640, especially on page 10 and 11.

The terms "engage" as used in the description refer to arranging things so that they are in proper position or match something else, or they are joining to support something. For example the supporting portions are engaged to match each other by a non-fixed attachment.

Figure 9:
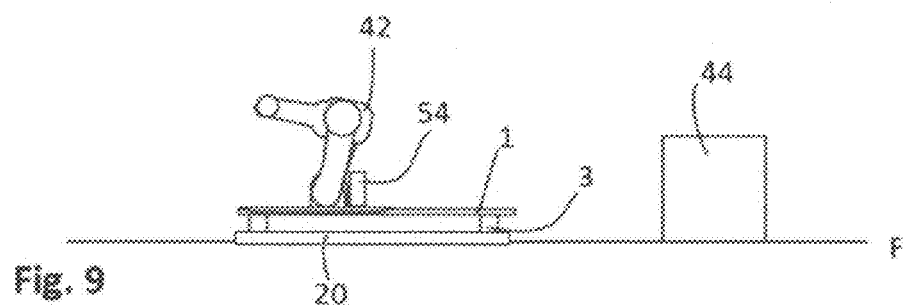
FIG. 9 shows a manipulator positioned on a platform docked in a docking station.

FIG. 9 illustrates the use of a system according to the invention for positioning a mobile robot in relation to a workstation 44. The robot includes a manipulator 42 comprising a plurality of parts, such as arms, movable relative to each other about a plurality of axes, and a robot control unit 54 including a robot controller for controlling the motions of the manipulator 42. The manipulator 42 is about to perform work at the workstation, for example assembling of parts, drilling, grinding or welding. The workstations may contain one or several fixed machines, a fixture for holding work pieces, or a table. The manipulator 44 is positioned on and attached to a movable platform 1. The manipulator 44 is positioned on an upper side of movable platform 1. A docking station 20 is attached to a floor. The docking station 20 can be positioned on the floor, or recessed in the floor. The docking station 20 is plate shaped, and accordingly is rather thin. As seen from the figure, the docking system has no protruding parts. The docking station is positioned so that the openings of the recesses are positioned upwards.

The manipulator 42 performs work at the workstation 44. The platform 1 with the manipulator 42 is moved between different workstations. The protruding members are protruding downwards in a direction towards the floor. At each workstation, a docking station 20 is installed. The platform 1 is moved to a position above the docking station 20. The platform is lowered until the protruding parts are inserted in the recesses, and the positioning portions are positioned in the positioning sections. By that, the platform is docked to the docking station. The protruding members and the recesses are cooperating during the docking operation. The docking operation is performed vertically.

The present invention is not limited to the embodiments disclosed but may be varied and modified within the scope of the following claims. For example, the docking station can be designed in many different ways. For example, the docking station may include two or more separate plates with each plate having a recess.

Further, the skilled person will understand how different locking devices can be installed and configured to lock the platform on the docking station. The skilled person will also understand how a control unit can be programmed to perform the connecting and locking of the platform on the docking station.

The invention claimed is:

1. A docking system comprising:
a plurality of protruding members attached to a platform,
a docking station arranged at a workstation, the docking station comprising a plurality of recesses adapted to receive the protruding members for positioning the platform relative to the workstation, wherein each of the plurality of recesses comprises:
a positioning section defining a space and a supporting section tapering towards the positioning section and having at least one support surface, wherein the support surface has an angle $\alpha_1$ in relation to a center axis of the recess, and the angle $\alpha_1$ of the support surface is between 30° and 70°, between 35° and 65°, or between 40° and 55°, and
a funnel shaped guiding section tapering towards the supporting section, and the guiding section has a guiding surface having an angle $\alpha_2$ in relation to the center axis of the recess, and the angle $\alpha_2$ of the guiding surface is equal to or larger than the angle $\alpha_1$ of the support surface,
wherein the angle $\alpha_2$ of the guiding surface is defined by the equation:

$$\tan(90-\alpha_2) > \mu,$$

whereby $\mu$ is the static friction coefficient between the guiding surface and the positioning portion
wherein the protruding members protrude away from a bottom surface of the platform, and an outer end of each of the protruding members comprises:
a positioning portion designed to at least partly fit in said space, and
a bearing portion tapering towards the positioning portion and having a bearing surface, the bearing surface is adapted to bear on the support surface when the positioning portion is fitted in said space, and the positioning section and the positioning portion are designed so that an accommodation is formed below the positioning portion when the positioning portion is fitted in said space.

2. The system according to claim 1, wherein the positioning section and the positioning portion are designed so that said accommodation is formed between a bottom of the positioning section and the positioning portion when the positioning portion is fitted in said space.

3. The system according to claim 2, wherein said accommodation has a height of at least 0.1 mm, at least 0.5 mm, or at least 1 mm.

4. The system according to claim 1, wherein each of the plurality of recesses is rotationally symmetric and a radial distance (d) between an upper periphery of the guiding surface and a lower periphery of the support surface is more than 5 mm.

5. The system according to claim 1, wherein each of the plurality of recesses, the bearing portion and positioning portion are rotationally symmetric.

6. The system according to claim 1, wherein the protruding members are designed as legs arranged to support the platform.

7. The system according to claim 1, wherein each of the plurality of protruding members comprises a distance portion arranged between the platform and said outer end.

8. A method of docking the movable platform in relation to the workstation, comprising:
providing the system according to claim 1, wherein the recesses have openings, the docking station is attached to a floor with the openings turned upwards, the manipulator is positioned on the movable platform, and the protruding members are directed downwards towards the floor, and
inserting the protruding members into the recesses until the positioning portions are positioned in the positioning sections.

9. The system according to claim 1, wherein a height (h1) of the positioning portion is less than a height (h2) of the positioning section.

* * * * *